D. DESHON, 2d.
Church.
No. 27,701.
Patented April 3, 1860.
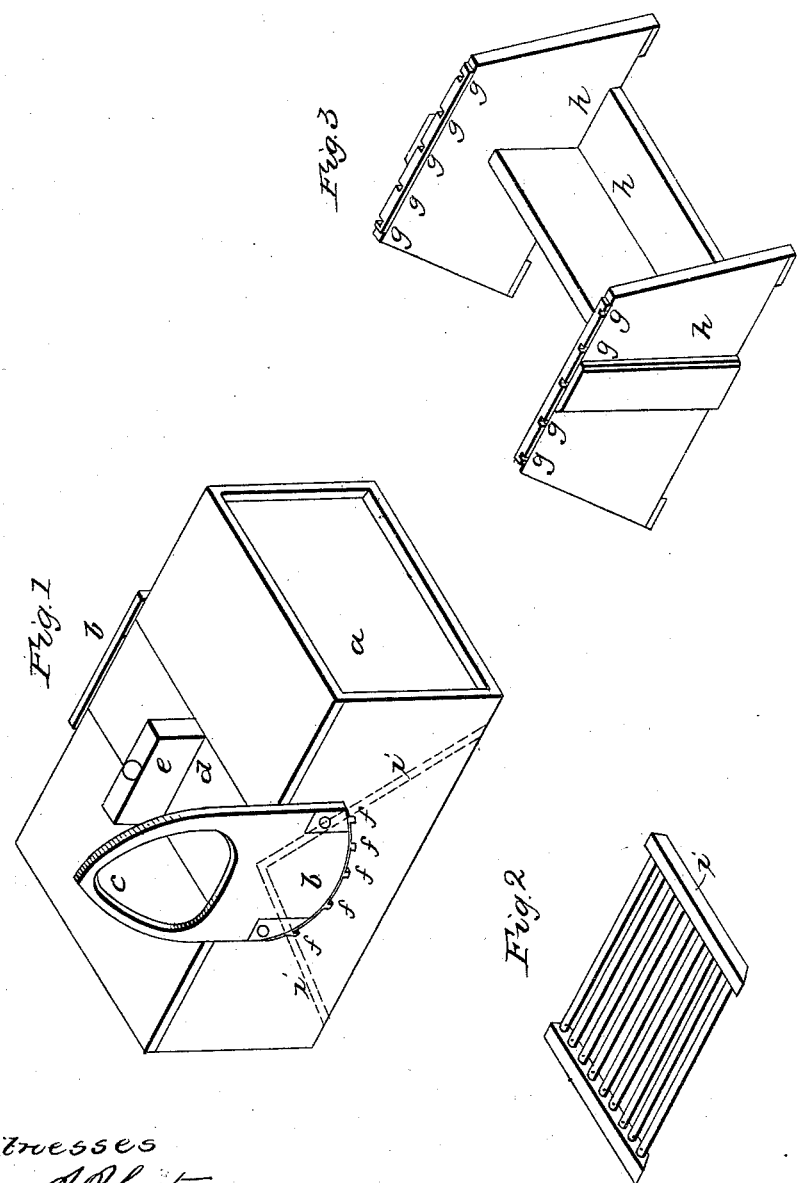

UNITED STATES PATENT OFFICE.

DANIEL DESHON, 2D, OF SOMERSET, PENNSYLVANIA.

CHURN.

Specification of Letters Patent No. 27,701, dated April 3, 1860.

*To all whom it may concern:*

Be it known that I, DANIEL DESHON, 2d, of the town and county of Somerset, in the State of Pennsylvania, have invented a new and useful Improvement in Churns; and I do hereby declare that the following is a full and exact description thereof, reference being had to the accompanying drawings and to the letters of reference marked thereon. Similar letters referring to similar parts.

The nature of my invention consists in a mechanical arrangement for changing the fulcrum of the vessel which contains the milk as the weight of milk passes from one end of the vessel to the other, thereby saving a very large amount of labor.

In the accompanying drawings, Figure 1, is a perspective view of the vessel which contains the milk, and represents the arrangement of the breaking racks or dashers and also the arrangement of rockers (b) which act as fulcrums and which are furnished with a number of projections which are used as guides for rockers (b). Fig. 2, is a perspective view of one of the breakers or racks. Fig. 3, is a perspective view of the pedestal or chair on which the vessel that contains the milk is suspended, (a) is the vessel which contains the milk, this vessel is constructed in the form represented in Fig. 1, and is furnished with projections (f) which act as guides for the rockers (b).

The racks or breakers (i) are constructed in the form represented in Fig. 2, and are arranged in the vessel (a) in the position represented by the dotted lines seen in Fig. 1. Experience has demonstrated the fact that butter will be produced from the milk or cream in a much shorter space of time by arranging the racks in the position represented in Fig. 1, than can be done by any other arrangement of said racks; (h) is the pedestal or chair which is constructed in the form represented in Fig. 3, and is furnished with ways for the rockers (b) of vessel (a). These ways have a number of notches marked (g) which correspond in position, size, and number to the position size and number of projections on the rockers (b), (c) is the handle used in operating the churn, (e) is the handle of the lid.

The size and form of the chair or pedestal (h), the rack or breakers (i), the milk vessel (a) and the rockers (b), must in all cases correspond and be adapted the one to the other as represented in the accompanying drawings.

Now the operation of churning in this churn is performed by applying a little force to the handle (c) moving it back and forward; by this means the vessel is thrown on an incline plane alternately from one end of the vessel to the other, forcing the material to be churned through the racks or dashers by its own weight, and this is done without contending but very little with the weight from the fact that the fulcrum at the bottom of the rockers (b) changes from one end to the other in accordance to the change of the weight inside of the vessel, always keeping in the center of the weight; consequently balancing the weight in its motion and saving most of the labor required to churn.

Having thus described the nature construction and operation of my improvement in churns, what I claim as of my invention and desire to secure by Letters Patent of the United States is—

The combination and arrangement of the racks or breakers (i) vessel (a), pedestal or chair (h) with the rockers (b) with projections (f) and notches (g) in the rocker ways, the whole being combined, arranged, constructed and operated in the manner herein described and for the purpose set forth.

DANIEL DESHON, 2ND.

Witnesses:
JAMES J. JOHNSTON,
GEORGE P. STECK.